United States Patent
Savelieva et al.

(10) Patent No.: US 9,967,319 B2
(45) Date of Patent: May 8, 2018

(54) SECURITY CONTEXT MANAGEMENT IN MULTI-TENANT ENVIRONMENTS

(71) Applicant: Microsoft Technology Licensing, LLC, Redmond, WA (US)

(72) Inventors: Alexandra Savelieva, Bellevue, WA (US); Mohammad Usman, Bellevue, WA (US); Daniel Eshner, Bellevue, WA (US); Nuwan Ginige, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/508,193

(22) Filed: Oct. 7, 2014

(65) Prior Publication Data

US 2016/0099915 A1 Apr. 7, 2016

(51) Int. Cl.
*H04L 29/06* (2006.01)
*H04L 29/08* (2006.01)

(52) U.S. Cl.
CPC .......... *H04L 67/10* (2013.01); *H04L 63/0428* (2013.01); *H04L 63/0478* (2013.01)

(58) Field of Classification Search
CPC ... H04L 63/029; H04L 63/10; H04L 63/1408; H04L 67/10; H04L 63/08; H04L 63/0428; H04L 63/0478
USPC ...................................................... 726/15, 23
See application file for complete search history.

(56) References Cited

U.S. PATENT DOCUMENTS

| | | | | |
|---|---|---|---|---|
| 5,014,314 A * | 5/1991 | Mulford | ................ | H04W 84/08 370/314 |
| 5,796,830 A * | 8/1998 | Johnson | ................ | H04L 9/0894 380/277 |
| 6,449,720 B1 * | 9/2002 | Sprague | ................ | G06F 21/602 380/255 |
| 7,231,372 B1 * | 6/2007 | Prange | .................. | G06Q 20/04 455/558 |
| 7,254,835 B2 * | 8/2007 | St. Pierre | ................ | H04L 29/06 370/408 |
| 7,885,410 B1 * | 2/2011 | Meier | ...................... | H04L 9/08 380/270 |

(Continued)

OTHER PUBLICATIONS

Chaiken, et al., "Scope: Easy and Efficient Parallel Processing of Massive Data Sets", In Proceedings of the VLDB Endowment, vol. 1, Issue 2, Aug. 2008, 12 pages.

(Continued)

*Primary Examiner* — David García Cervetti

(57) ABSTRACT

Examples of the present disclosure describe security context enforcement in a multi-tenant environment. Security context data may be transmitted through an un-secure multi-tenant computational environment. The security context data is secured by protection layers that restrict untrusted resources from running tenant applications and restrict the ability of unauthorized tenants to access context information associated with a tenant. Data may be received and evaluated at a component of a multi-tenant environment. If the component is a trusted component and the security context data indicates that the tenant is authorized to execute an application using a specified context, the component may run a tenant application in a context associated with the security context data.

19 Claims, 8 Drawing Sheets

(56) References Cited

U.S. PATENT DOCUMENTS

| | | | | |
|---|---|---|---|---|
| 8,626,821 B2* | 1/2014 | Brignone | G06F 17/30861 | 709/203 |
| 8,700,906 B2* | 4/2014 | Kamara | G06F 9/5072 | 713/180 |
| 9,027,143 B1* | 5/2015 | Agrawal | G06F 21/51 | 380/232 |
| 9,044,855 B2* | 6/2015 | Kudo | B25J 9/0003 | |
| 9,110,902 B1* | 8/2015 | Dorwin | G06F 21/6209 | |
| 2001/0018736 A1* | 8/2001 | Hashimoto | G06F 21/10 | 713/1 |
| 2002/0073309 A1* | 6/2002 | Kurn | H04L 9/083 | 713/155 |
| 2002/0156889 A1* | 10/2002 | Crudele | G06F 8/61 | 709/224 |
| 2003/0056108 A1* | 3/2003 | Mont | G06F 21/6209 | 713/193 |
| 2004/0034875 A1* | 2/2004 | Bulkowski | H04J 3/047 | 725/136 |
| 2004/0240411 A1* | 12/2004 | Suzuki | H04W 12/06 | 370/331 |
| 2006/0026422 A1* | 2/2006 | Bade | H04L 63/104 | 713/164 |
| 2006/0075075 A1* | 4/2006 | Malinen | H04W 48/16 | 709/220 |
| 2006/0168347 A1* | 7/2006 | Martin | G06F 9/546 | 709/246 |
| 2006/0294370 A1* | 12/2006 | Greenspan | G06F 21/53 | 713/164 |
| 2007/0005359 A1* | 1/2007 | Bowen | G06Q 40/02 | 704/251 |
| 2007/0005992 A1* | 1/2007 | Schluessler | G06F 21/54 | 713/193 |
| 2007/0101133 A1* | 5/2007 | Liu | H04L 63/0485 | 713/168 |
| 2007/0171871 A1* | 7/2007 | Forsberg | H04W 12/04 | 370/331 |
| 2007/0192857 A1* | 8/2007 | Ben-Itzhak | G06F 21/54 | 726/22 |
| 2007/0224993 A1* | 9/2007 | Forsberg | H04L 9/0844 | 455/436 |
| 2007/0271459 A1* | 11/2007 | Gomez | H04L 63/0442 | 713/171 |
| 2008/0039096 A1* | 2/2008 | Forsberg | H04L 63/126 | 455/438 |
| 2008/0065907 A1* | 3/2008 | Nutter | G06F 9/461 | 713/193 |
| 2008/0066074 A1* | 3/2008 | Nutter | G06F 21/52 | 718/107 |
| 2008/0066075 A1* | 3/2008 | Nutter | G06F 9/485 | 718/107 |
| 2008/0134310 A1* | 6/2008 | Borde | G06F 21/53 | 726/7 |
| 2008/0205643 A1* | 8/2008 | Chen | H04L 63/0428 | 380/205 |
| 2008/0219448 A1* | 9/2008 | Almeida | H04L 9/065 | 380/277 |
| 2008/0233963 A1* | 9/2008 | Alanara | H04W 12/06 | 455/438 |
| 2008/0288940 A1* | 11/2008 | Adams | G06F 9/45504 | 718/1 |
| 2009/0055641 A1* | 2/2009 | Smith | G06F 21/57 | 713/100 |
| 2009/0070586 A1* | 3/2009 | Bucker | H04L 63/0428 | 713/171 |
| 2009/0172814 A1* | 7/2009 | Khosravi | G06F 21/51 | 726/23 |
| 2009/0291685 A1* | 11/2009 | Morimoto | H04B 7/155 | 455/436 |
| 2010/0077469 A1* | 3/2010 | Furman | G06F 21/41 | 726/8 |
| 2010/0257364 A1* | 10/2010 | Baek | H04L 9/0877 | 713/170 |
| 2011/0191599 A1* | 8/2011 | Chou | G06F 21/72 | 713/193 |
| 2011/0225431 A1* | 9/2011 | Stufflebeam, Jr. | G06F 21/62 | 713/190 |
| 2011/0246766 A1* | 10/2011 | Orsini | G06F 11/1076 | 713/160 |
| 2011/0258430 A1* | 10/2011 | Luukkala | H04L 9/3073 | 713/150 |
| 2011/0296499 A1* | 12/2011 | Knjazihhin | G06F 21/604 | 726/4 |
| 2012/0008768 A1* | 1/2012 | Mundra | H04L 9/0637 | 380/28 |
| 2012/0042332 A1* | 2/2012 | Wajs | H04L 9/088 | 725/31 |
| 2012/0166818 A1* | 6/2012 | Orsini | H04L 9/085 | 713/193 |
| 2012/0278634 A1* | 11/2012 | Luukkala | H04L 63/0442 | 713/189 |
| 2012/0297188 A1* | 11/2012 | van der Linden | G06F 21/602 | 713/165 |
| 2013/0005255 A1* | 1/2013 | Pering | H04W 4/005 | 455/41.2 |
| 2013/0024919 A1 | 1/2013 | Wetter et al. | | |
| 2013/0124866 A1* | 5/2013 | Farrugia | H04L 9/0822 | 713/171 |
| 2013/0174239 A1* | 7/2013 | Kim | G06F 21/31 | 726/7 |
| 2013/0191882 A1* | 7/2013 | Jolfaei | H04L 63/0807 | 726/4 |
| 2013/0227704 A1* | 8/2013 | Boivie | G06F 21/31 | 726/27 |
| 2013/0305386 A1* | 11/2013 | Zhang | H04L 63/205 | 726/27 |
| 2014/0068262 A1* | 3/2014 | Robertson | H04L 63/0428 | 713/168 |
| 2014/0075501 A1* | 3/2014 | Srinivasan | G06F 21/62 | 726/1 |
| 2014/0164515 A1* | 6/2014 | Maltbie | H04L 67/06 | 709/204 |
| 2014/0215574 A1 | 7/2014 | Erb et al. | | |
| 2014/0258129 A1* | 9/2014 | Eyes | G06F 21/606 | 705/50 |
| 2014/0282821 A1* | 9/2014 | Adler | H04L 63/10 | 726/1 |
| 2015/0033020 A1* | 1/2015 | Madden | G06F 21/6218 | 713/171 |
| 2015/0200958 A1* | 7/2015 | Muppidi | H04L 41/28 | 726/23 |
| 2015/0227755 A1* | 8/2015 | Lee | H04L 9/0863 | 713/165 |
| 2015/0310188 A1* | 10/2015 | Ford | G06F 21/10 | 726/28 |
| 2016/0036792 A1* | 2/2016 | Henning | H04L 63/0478 | 713/168 |
| 2016/0042195 A1* | 2/2016 | Agarwal | G06F 9/44505 | 726/17 |
| 2016/0044041 A1* | 2/2016 | Agarwal | G06F 9/45558 | 726/4 |
| 2016/0119294 A1* | 4/2016 | Petach | H04L 63/0428 | 713/150 |
| 2016/0156671 A1* | 6/2016 | Cabrera | H04L 63/20 | 726/1 |

OTHER PUBLICATIONS

McDermott, et al., "Using Abuse Case Models for Security Requirements Analysis", In Proceedings of the 15th Annual Computer Security Applications Conference, Dec. 6, 1999, 11 pages.

Howard, et al., "The Security Development Lifecycle: SDL: A Process for Developing Demonstrably More Secure Software", In Proceeding of Microsoft Press, Jun. 28, 2006, 4 pages.

Fehling, et al., "Cloud Computing Patterns: Fundamentals to Design, Build, and Manage Cloud Applications", In Book of Communication Networks, Mar. 2014, 4 pages.

(56) References Cited

OTHER PUBLICATIONS

Mather, et al., "Cloud Security and Privacy: An Enterprise Perspective on Risks and Compliance", In Book Cloud Security and Privacy an Enterprise Perspective on Risks and Compliance, Oct. 5, 2009, 5 pages.
Winkler, Vic (J.R.), "Securing the Cloud: Cloud Computer Security Techniques and Tactics", In Book of Syngress, 1st Edition, Apr. 29, 2011, 5 pages.
Krutz, et al., "Cloud Security: A Comprehensive Guide to Secure Cloud Computing", In Book of Wiley, 1 Edition, Jul. 2010, 2 pages.
"Microsoft Threat Modeling Tool", Published on: Apr. 14, 2014, Available at: http://www.microsoft.com/en-us/download/details.aspx?id=42518.
Kamara, et al., "Dynamic searchable symmetric encryption", In 19th ACM Conference on Computer and Communications Security, Oct. 16, 2012, 24 pages.
Eliot, Seth, "Microsoft Cosmos: Petabytes perfectly processed perfunctorily", Published on: Nov. 15, 2010, Available at: http://blogs.msdn.com/b/seliot/archive/2010/11/05/cosmos-petabytes-perfectly-processed-perfunctorily.aspx, 2 pgs.
Isard, Michael, "Autopilot: Automatic Data Center Management", Published on: Apr. 2007, Available at: http://paperhub.s3.amazonaws.com/e6a99c5b6a2ac68b4b47a0c68c5af4f5.pdf, 8 pgs.
"Breach Notification for Unsecured Protected Health Information", In Proceedings of Federal Register, vol. 74, No. 162, Aug. 24, 2009, 31 pages.
"The OAuth 1.0 Protocol", Published on: Apr. 2010, Available at: http://www.rfc-editor.org/rfc/rfc5849.txt, 35 pgs.
"Kafka 0.8.1 Documentation", Retrieved on: Aug. 13, 2014, Available at: https://kafka.apache.org/documentation.html, 52 pgs.
"Storm: The Apache software foundation", Retrieved on: Aug. 13, 2014, Available at: https://storm.incubator.apache.org/, 2 pgs.
Franchitti, et al., "Understanding Cloud Security Challenges", In Cognizant Insights White Papers, Nov. 2012, 5 pages.
Kashyap, et al., "Crypto Multi Tenant: An Environment of Secure Computing Using Cloud SQL", In International Journal of Distributed and Parallel Systems, vol. 5, May 2014, 9 pages.

Brohi, et al., "Identifying and Analyzing Security Threats to Virtualized Cloud Computing Infrastructures", In Proceedings of International Conference on Cloud Computing Technologies, Applications and Management, Dec. 8, 2012, 5 pages.
"Cloud-10 Multi Tenancy and Physical Security", Published on: Aug. 13, 2011 Available at: https://www.owasp.org/index.php/Cloud-10_Multi_Tenancy_and_Physical_Security, 3 pgs.
Takahashi, et al., "Enabling Secure Multitenancy in Cloud Computing: Challenges and Approaches", In Proceedings of 2nd Baltic Congress on Future Internet Communications, Apr. 25, 2012, 8 pages.
Narayanan, et al., "Ensuring access control in cloud provisioned healthcare systems", In Proceedings of 1st IEEE International Workshop on Consumer eHealth Platforms, Services and Applications, Jan. 9, 2011, 5 pages.
"NetApp, Cisco, and VMware Deliver End-to-End Secure Multi-Tenancy", Retrieved on: Aug. 13, 2014 Available at: http://www.cisco.com/c/dam/en/us/td/docs/solutions/Enterprise/Data_Center/Virtualization/Secure_Multi-Tenancy_Brief.pdf, 4 pgs.
"Choosing a Multi-Tenant Data Architecture", Published on: Jan. 19, 2013 Available at: http://msdn.microsoft.com/en-us/library/hh534480.aspx, 22 pgs.
Chong, et al., "Multi-Tenant Data Architecture", Published on: Jun. 2006 Available at: http://msdn.microsoft.com/en-us/library/aa479086.aspx, 11 pgs.
"Securing Multi-Tenancy and Cloud Computing", In White Papers of Juniper Networks, Sep. 16, 2012, 5 pages.
"Security in Private Database Clouds", In Oracle White Paper, Jul. 2012, 14 pages.
Tang, et al., "A Multi-Tenant RBAC Model for Collaborative Cloud Services", In Proceedings of Eleventh Annual International Conference on Privacy, Security and Trust, Jul. 10, 2013, 10 pages.
PCT International Search Report and Written Opinion Issued in PCT Application No. PCT/US2015/054111, dated Dec. 8, 2015, 11 Pages.
PCT Second Written Opinion in PCT/US2015/054111, dated Sep. 9, 2016, 7 pages.

* cited by examiner

100

400

SECURITY CONTEXT MANAGEMENT IN MULTI-TENANT ENVIRONMENTS

BACKGROUND

Challenges exist for securing sensitive data and mitigating security threats in computational environments that are shared by many tenants. Security breaches may likely result if appropriate security controls are missing. It is with respect to this general technical environment that the present application is directed.

SUMMARY

Examples of the present disclosure describe security context enforcement in a multi-tenant environment. Security context data may be transmitted through an un-secure multi-tenant computational environment. The security context data is secured by protection layers that restrict untrusted resources from running tenant applications and restrict the ability of unauthorized tenants to access context information associated with a tenant. Data may be received and evaluated at a component of a multi-tenant environment. If the component is a trusted component and the security context data indicates that the tenant is authorized to execute an application using a specified context, the component may run a tenant application in a context associated with the security context data.

Additional aspects, features, and/or advantages of examples will be set forth in part in the description which follows and, in part, will be apparent from the description, or may be learned by practice of the disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Shared computational environments are accessed by many different tenants. A tenant may correspond to a single user account or a group user account. As non-limiting examples, a tenant may be related to a group, an organization, a company, business or an individual that may be executing a service or running an application. A tenant may utilize a shared computational environment. A shared computational environment may be any computing environment including data or network resources that are accessible to more than one tenant. A distributed network is an example of a shared computational environment. A distributed network may be any networking model that provides services using shared resources for processing over a network. An exemplary shared computational environment may be cloud-based to access resources (processing power and storage) for running their applications across various data fabrics and processing environments. For that purpose, multiple tenants may use a shared application platform. A shared application platform may be a component of a system that provides services for applications including operating systems, execution services, data services, cloud services and development tools, among other examples. The shared application platform may be a set of tools and technologies for scheduling applications for tenants, managing shared resources, and monitoring health of the computational processes, among other related tasks.

Data transmitted throughout a computational environment that is shared by multiple tenants is susceptible to security threats that can be either purposeful or inadvertent. Security measures may be implemented to isolate tenants by hosting tenant applications on different virtual machines. Scalability issues (e.g. inefficient use of computational resources of the shared application platform) may be presented when applying such isolation to a large number of tenants. In the extreme case, such solutions as a demilitarized zone (DMZ), may be implemented. Such security measures may require implementation of dedicated resources (essentially replacing a multitenant environment with multiple single-tenant environments), which involves higher support and operational costs, as well as scalability issues. Alternatively, if a super-user account of shared application platform is acting as intermediary between tenant applications and external data fabric/operational environment, it requires that all tenants should authorize the shared application platform to access their data sources. This approach is prone to development errors, reduces tenant's accountability for operations and may result in undetectable unauthorized access to data belonging to other tenants.

Figure 1:
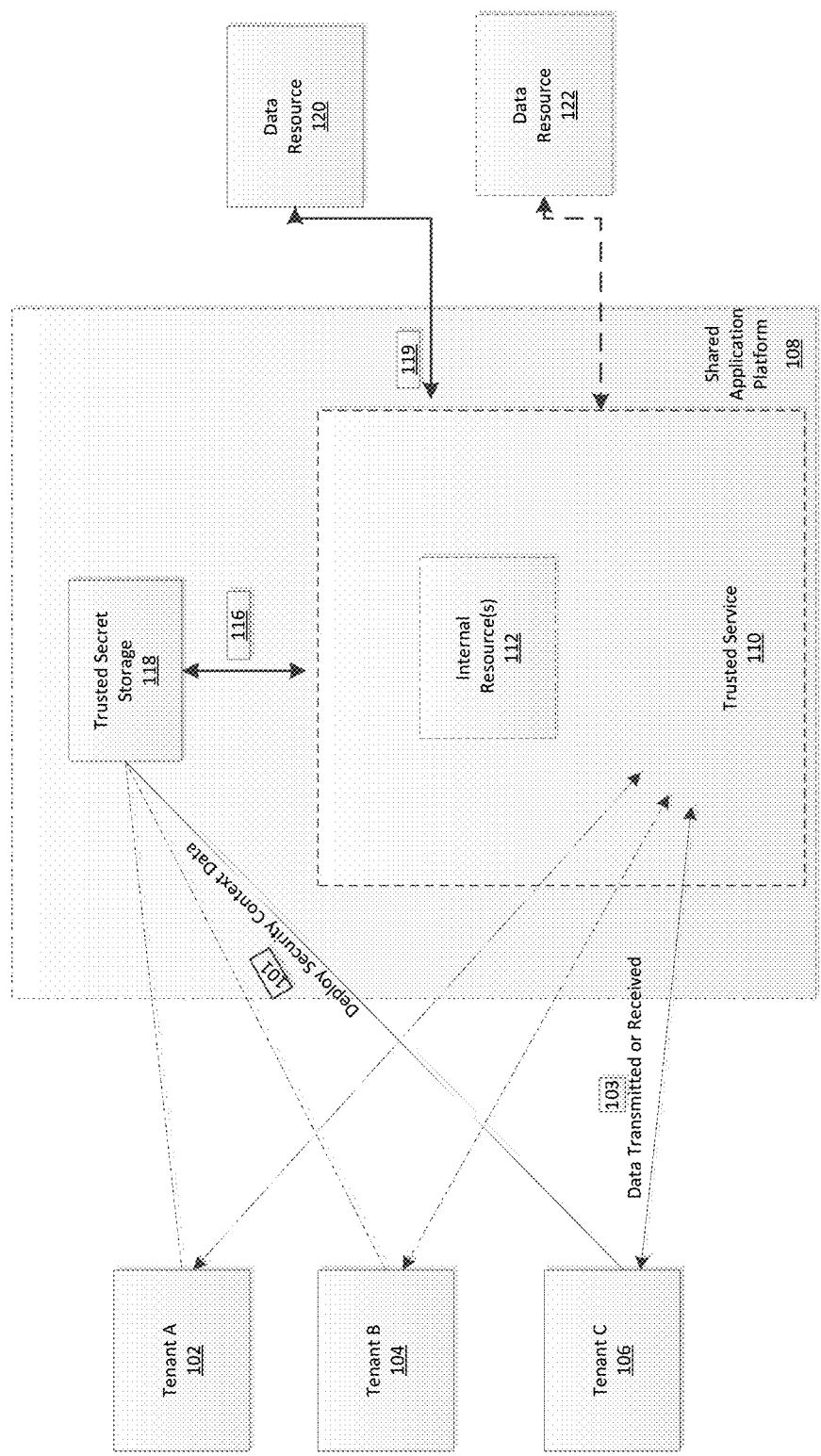
FIG. 1 illustrates an overview of a system of a multi-tenant computational environment.

FIG. 1 illustrates an overview of a system 100 of a multi-tenant computational environment. The system 100 is a combination of interdependent components that interact to form an integrated whole. Components of the system 100 may include both hardware and software running on components of the system 100, and may be connected to network with other components of the system 100. The multi-tenant computational environment in this example is a distributed network that is shared by multiple tenants. The multi-tenant distributed network may be any networking model that provides services using shared resources for processing data for multiple tenants over a network. As an example, the multi-tenant computational environment may be a cloud-based environment. The system 100 implements sealing and unsealing schemes for data transmitted through the multi-tenant computational environment. A sealing scheme secures data so that only authorized users or components of the system 100 are able to access the data. An unsealing scheme is a process that prevents unauthorized users or components of the system 100 from accessing data that was sealed by the sealing scheme. Implementation of such security schemes into a security framework of a system, such as the system 100, may prevent un-trusted devices from accessing sensitive data as well as prevent an unauthorized application from running using an account of a tenant.

The system 100 may enable one to many tenants, for example tenant A 102, tenant B 104, and tenant C 106, to use computational resources for running applications on different data fabrics or operational environments, such as data resource 120 and data resource 122, by leveraging a shared application platform 108. An external data fabric or operational environment such as data resource 120 or data resource 122 is a component or collection of components connectable to the multitenant computational environment. Data resources may be external to the shared application platform 108 or components that are used for computational processing. Among other examples, a data resource may be a computer resource, an application, a database, a computer program or any other device or information that can be remotely accessed by an application running on the multi-tenant computational environment. The shared application platform 108 is a system that is able to access facilities or data resources of the multi-tenant computational environment. The shared application platform 108 implements a security framework to enforce security context on a tenant application to restrict unauthorized, access to data of data fabrics, external storages, operational environments, etc. The shared application platforms 108 may include hardware and/or software components that are implemented on hardware components. A software component may be a computer-implemented process or program. Hardware components of the multi-tenant computational environment possess means for implementing a software process or program. Please refer to FIGS. 5-7 for additional description. In one example, a tenant such as tenant C 106 may seek access to data resource 120 when launching its' application via the shared application platform 108. Other tenants such as tenant A 102 and tenant B 104 may also seek access to data resources 120 and 122 for data processing.

The shared application platform 108 may include a number of shared devices that manage access to sealed data. As an example, the shared application platform 108 may include a trusted service 110 for accessing secrets and launching tenant applications in a specific security context and a trusted secret storage 118 of the trusted service 110. However, one skilled in the art would recognize that the scale of the shared application platform 108, including the number of components utilized by the shared application platform 108, may vary. The trusted service 110 is used for managing access to tenant sensitive data or secret data from a trusted secret storage 118 (e.g., trusted source) of the shared application platform 108, running tenant applications in the multi-tenant computational environment within a specific security context that has lower privileges than a trusted machine account or other trusted components of the shared application platform 108, and provisioning necessary pieces of security context data at run time to run an application of a tenant. The trusted secret storage 118 is a trusted source of secrets that ensures that pieces of the security context data are sealed with a security layer which only trusted components of the trusted service 110 can unseal. In one example, the trusted secret storage 118 may be application based. As an example, the trusted secret storage 118 may be a trusted platform module (TPM) that protects sensitive information by binding the sensitive information to platform configuration information including, the software and hardware being used. As an example, the trusted secret storage 118 may be implemented on a TPM chip of a mobile device such as a laptop, mobile phone, tablet, etc.

The security context data from tenant A 102, tenant B 104 and tenant C 106, passes through the shared application platform 108 that is applied to applications launched by the tenant that access external data fabrics or operational environments such as data resource 120 or data resource 122. The shared application platform 108 may be hosted on geographically distributed data centers and controllable by many different operational groups within an organization. As an example, an operational group may be a grouping of users that are assigned to perform specific tasks. Thus, security of data and verification that a tenant is privileged to execute applications under a specific security context, are paramount.

Various components may be implemented as part of the shared application platform 108. As identified above, a component may be any hardware or software resource applicable to the shared application platform 108. One such component that may be implemented is a software-based security framework employable on one or more hardware devices of the shared application platform 108. The security framework provides robust tools for enforcing application-level security context while allowing the multi-tenant computational environment to retain openness associated with example multi-tenant distributed networks, such as a cloud computing environment. A security framework may be implemented on the shared application platform 108 including the trusted service 110, the trusted secret storage 118 and a protocol implemented by the trusted service 110 for ensuring security of security context data transmitted. The security framework enforces security context in multi-tenant computational environment. The protocol allows tenants to bind its pieces of security context to an application of the tenant and restricts the ability of other tenants to abuse tenant-specific information. The shared application platform 108 implements the protocol and checks to authorize a tenant at a moment when a tenant application is launched. The trusted service 110 also establishes secure connection with tenant's application for passing the security context data to tenant applications as necessary. Altogether this allows for isolation of tenants' applications inside of the multitenant computational environment and tenants' data outside of the multitenant computational environment.

To achieve this, the shared application platform 108 implementing the security framework may perform the following operations:
1. Impersonation of applications under tenant-provided accounts.
2. Establishing secure connection between the trusted service 110 and tenant applications
3. Sealing methods to keep security context data associated with a tenant safe from other tenants.
4. Restricting access to unseal sensitive data associated with a tenant where only a trusted component of the shared application platform 108 code running under a high-privileged account can unseal the sensitive data.

An exemplary shared application platform 108 can be customized to work with any external data fabric as the exemplary shared application platform 108 has a multi-layered extensibility model that facilitates integration with future data layers of value.

The system 100 of the multi-tenant computational environment may provide data protection services, to prevent unauthorized access to sensitive data from untrusted devices, programs and users. Data protection services provided by the computational environment may be software-based and agnostic to an actual storage device. In an exemplary computational environment, a tenant may have an ability to seal sensitive data but only trusted devices of the shared application platform 108 can unseal the sensitive data of a tenant. The exemplary shared application platform 108 may provide added security on top of that of the computational environment by adding a protocol for binding tenant sensitive data to their authorized user. The protocol prevents the unauthorized use of a tenants' security context data by other tenants for running their applications in the computational environment. The security framework may run on one or more components or devices of the exemplary shared application platform 108.

In system 100, multiple tenants may interface with the shared application platform 108. As shown in FIG. 1, tenant A 102, tenant B 104 and tenant C 106 may interface with the trusted secret storage 118 to seal a portion of security context data. A portion or piece of security context data may be data specific to the client to run or execute a service or application. In one example multiple pieces or portions of security context data may be associated with a tenant. Further, a service or application being run by a tenant may be associated with multiples pieces or portions of security context data. The trusted secret storage 118 may be a data protection service provided by the computational environment that is software-based and agnostic to an actual storage device. In an example computational environment, a tenant may possess an ability to seal sensitive data but only trusted devices of the shared application platform 108 are able to unseal the sensitive data of a tenant. For instance, a portion of security context data may be encrypted so that only trusted components of the shared application platform 108 can access the portion of security context data. The security context may be represented by: a service account for running an application which is granted with permissions to access certain data storages, a database connection string (e.g., using SQL, MySQL, etc.), a certificate, or a token, or tenant credentials among other examples. The security context data is submitted using a protocol usable by the shared application platform 108 to validate that a tenant has access rights to execute a certain process under this account via the shared application platform 108. A tenant such as tenant C 106 may transmit security context data to a trusted source such as the trusted secret storage 118, as illustrated by communication 101 in FIG. 1.

In one example, the trusted service 110 running on the shared application platform 108 may include a number of components. Components of the trusted service 110 may be hardware and/or software running on hardware components or devices. As an example, the trusted service 110 may include components that are used to manage tenant applications. Once a tenant deploys applications and security context data, the shared application platform 108 takes over management of an application request and is capable to run a tenant application on behalf of a tenant. As examples, the trusted service 110 may include components or an internal resource 112 (or, in alternative examples, internal resources) that may perform management, processing and storage among other functionalities. In one example, the trusted service 110 may include a components or resources such as a management resource used to assign processing of tenant application requests, and processing resources used to evaluate and process the tenant application requests. In one example, computational resources (e.g., internal resource 112) may be treated as untrusted as untrusted application code may be running on said resource. A tenant may deploy security context data to a component of the trusted service 110, for example, the trusted secret storage 118 that limits the providing of the security context data to trusted resources of the trusted service 110. In a case where a request is made for security context data by an untrusted resource (e.g., a resource outside of the trusted service 110), the resource will be evaluated to determine if it is trusted to run a tenant application. If a resource is determined to be untrusted, the trusted service 110 may prevent the untrusted resource from receiving the security context data that it is not authorized to receive.

When the shared application platform 108 receives an assignment for running a tenant application 114, it may request retrieval of a piece of security context data associated with a tenant that initiated the request (e.g., tenant C 106), as shown by communication line 116 of FIG. 1. The trusted service request for the security context data may be submitted by the trusted service 110 for accessing secrets persisted on a trusted secret storage such as the trusted secret storage 118. The trusted secret storage 118 may be any software or hardware implementation that is able to secure sensitive data such as tenant security context data. The trusted secret storage 118 may evaluate the requested piece of security context data to determine if a component or resource is authorized to receive the piece of security context data. In one example, the internal resource 112 of the trusted service 110 may be evaluated. If the trusted service 110 determines that the internal resource 112 is authorized to receive the piece of security context data, the trusted secret storage 118 transmits the security context data to the trusted service 110 for evaluation, for example as shown by communication line 116 of FIG. 1. The trusted secret storage 118 may transmit the security context data in a secure form, such as encrypted data so that even if a security breach occurred and an untrusted device or service received the piece of security context data, security context data would not be compromised because the untrusted device is unable to access the security context data in the secure form.

Further, when the trusted service 110 receives at least a piece/portion of security context data, it evaluates the security context data to determine if tenant C 106 is authorized to use the security context data for running its application. If the check is successful, the trusted service 110 allows the internal resource 112 to use the security context data for running a tenant's application as under a low privileged untrusted account with no access to a secret store interface. Without the security framework implemented to run tenant's application in a specifically created security context (e.g. under the service account of a tenant such as tenant C 106), a tenant may be able to elevate privileges and gain unauthorized access to resources of the multi-tenant computational environment, for example where tenant C 106 may be able to access any resource that is available to the shared application platform 108 as a whole, or the pieces/or portions of security context data that belong to tenant B 104. As identified above, multiple pieces or portions of security context data may be associated with a tenant such as Tenant B 104. Application execution for a client may require one or more pieces or portions of security context data to execute a process. A piece/portion of security context data may be passed from the trusted service 110 to the application of tenant C 106 at run time as needed. For that purpose, the trusted service 110 initiates a secure connection between itself and a tenant application as shown by communication line 119 demonstrating connection between the trusted service 110 and an external resource such as data resource 120. As an example, secure connection between applications of tenant B 104 and the trusted service are not accessible to applications of tenant C 106 and vice versa.

Figure 2:
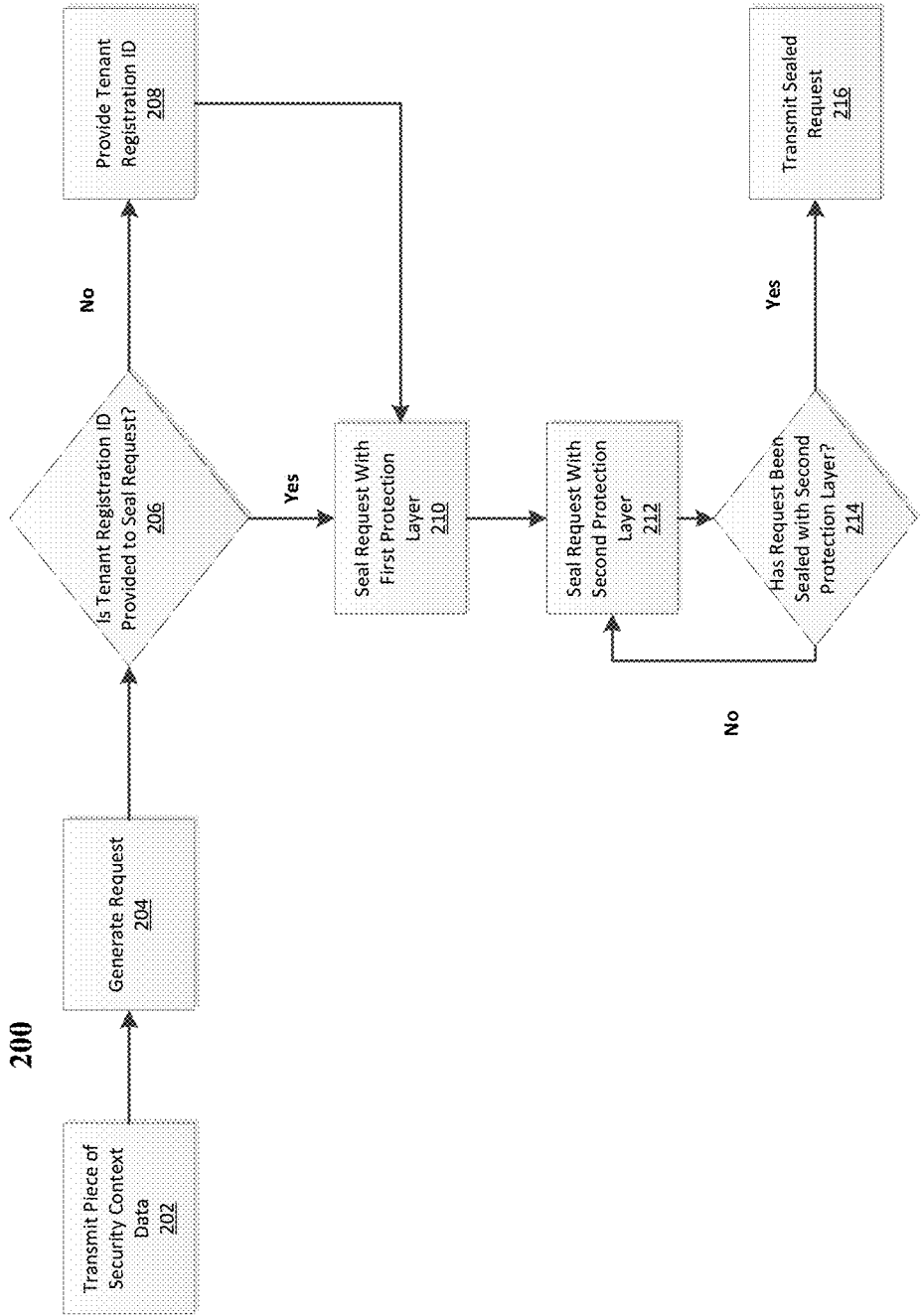
FIG. 2 is a method that may be performed by a tenant of a multi-tenant computational environment.

FIG. 2 is method 200 that may be performed by a tenant of the multi-tenant computational environment. As an example, a tenant (as described above) may own or use one or more components (e.g., applications/services/hardware, etc.) in a computational environment. The method 200 may be a computer-implemented method where operations or processes are performed on a tenant operated device having a processor. Processing devices may include but are not limited to a computer, laptop, and mobile devices such as a smartphone or tablet, among other examples.

Method 200 begins at decision operation 202 where a piece of security context data associated with execution of a process is transmitted from a tenant to a shared application platform such as the shared application platform 108 of FIG. 1. The piece of security context data may be any data that may be used by the shared application platform 108 to provide security context for an application the tenant seeks to execute. The security context data may be represented by: service account credentials for running an application which is granted with permissions to access certain data storages, a database connection string (e.g., using SQL, MySQL, etc.), certificate, or a token, among other examples. The security context data may be transmitted through an unsecure multi-tenant computational network. In one example, a tenant may set privileges or access rights to specified data for itself. In another example, a tenant may set/restrict access rights for another tenant. As an example, a tenant may secure (e.g., encrypt) security context data usable to execute an application of a tenant. The tenant may authorize another tenant to use the secured data for running an application or service. However, while another tenant may be able to use the secure data to run or access an application or service, the actual security context data is opaque to such tenants as it is secured. Security context data may be persisted in a secure trusted storage which may be a component of the shared application platform 108 and may be hardware or software implemented on a device of the multitenant computational environment. As an example, the trusted source may be a trusted source of secrets such as the trusted secret storage 118 of FIG. 1.

Method 200 proceeds to operation 204 where a request is generated. The request may be an application request related to executing a process on a resource, such as data resource 120 of FIG. 1. As an example, the generated request may include an executable file or a script. The executable file or executable task may relate to an application to be performed on data external from the multi-tenant computational network.

Once the request is generated, flow proceeds to decision operation 206 where a decision is made as to whether a tenants' registration identification (ID) is provided to seal the request. In a case where a tenant registration ID is not provided, method 200 branches "no" and a tenant is required to provide its tenant registration ID (operation 208). Once a tenant registration ID is provided or generated, the protocol of the security framework may communicate with the tenant device or service to seal or wrap request with a first protection layer (operation 210). In an exemplary shared application platform, the first protection layer may restrict an ability to unseal the request. At operation 210, the security context data is wrapped into a protection layer that restricts the ability of unauthorized tenants to use the security context data and restricts the ability of other users of the unsecure multi-tenant computational network from accessing it. In other words, the request is sealed to prevent unauthorized devices or services of the multi-tenant distributed network from accessing data associated with the request. The sealing performed in operation 210 may limit the ability to unseal data associated with the request so that only authorized devices or services of the shared application platform 108 can unseal the protection security layer implemented in operation 210. In an exemplary shared application platform, authorized components may be components authenticated by a trusted component (e.g., trusted service 110) of the multi-tenant computational environment. Further, the protection layer of operation 210 may be implemented on top of a public key infrastructure (PKI). In one example, the first security layer of operation 210 may be implemented on top of a PKI for cloud-based networking.

Flow 200 then proceeds to operation 212 where the request is sealed with a second protection layer. In an exemplary shared application platform, the second security layer may prevent un-specified tenants from accessing data or executing application processing associated with a tenant. In one example, a tenant registration ID may be used to seal the application request with a second protection layer. When application access is requested by a tenant of the multi-tenant computational environment, security context data may be evaluated to authorize a tenant seeking application access. If the tenant is not authorized then access to tenant-specific data of the request is denied. As identified above, a tenant may specify access rights or privileges for access to data associated with the request. Flow 200 may proceed to decision operation 214 where a tenant confirms whether the request has been sealed with the second protection layer implemented in operation 214. If not, flow branches "No" and returns to operation 212.

Once the security context data has been sealed with the first protection layer and the second protection layer, flow may proceed to operation 216 where the sealed request is transmitted through the multi-tenant computational environment.

Figure 3:
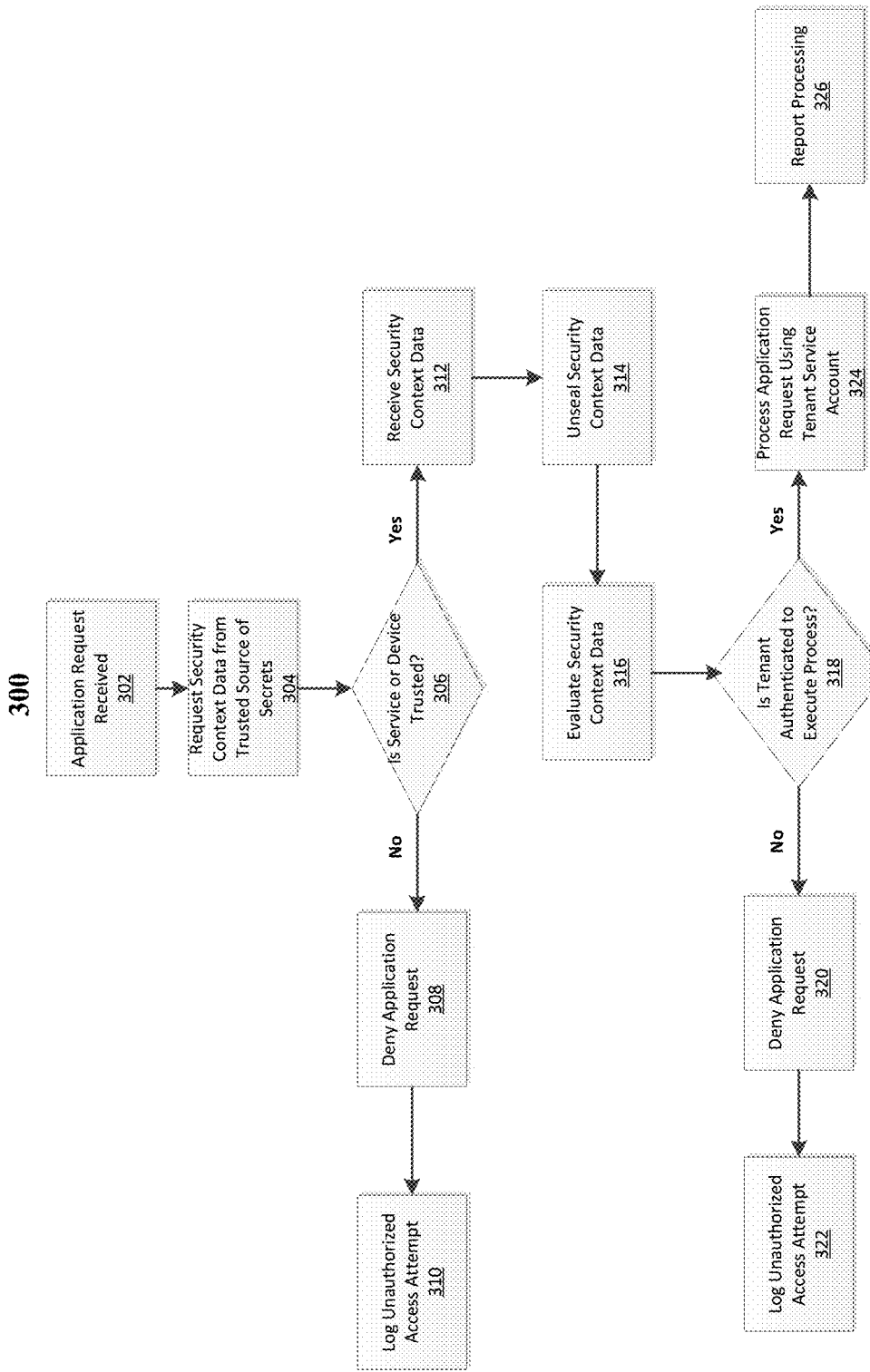
FIG. 3 is a method that may be executed using a multi-tenant computational environment.

FIG. 3 is method that may be executed using a multi-tenant computational environment. As an example, method 300 may demonstrate an interaction between components of a shared application platform such as the shared application platform 108 of FIG. 1. Method 300 may start at operation 302 where a component (such as a service or device) of the multi-tenant computational environment receives an application request for processing. As described in FIG. 2, the request may be generated from a tenant (e.g., tenant C 106 of FIG. 1) of the multi-tenant computational environment. In an example, a tenant may seek to run an application that accesses a resource of the multi-tenant computational environment such as an external data fabric or data resource.

Once the request is received, a resource or component of a multi-tenant computation environment may submit a request (operation 304) to retrieve security context data related to the request from a trusted source of secrets such as the trusted secret storage 118 as described in FIG. 1. The trusted source of secrets may be a component of a shared application platform that ensures that pieces of the security context data are sealed with a protection layer which only the trusted service can unseal. Flow proceeds to decision 306, where the trusted source of secrets may determine whether the service or device that made the request for security context data is authorized to receive the security context data associated with a tenant. That is, the trusted source of secrets will not reveal the security context data unless the service or device is authorized to receive the security context data. The service or device may provide an indication that it is trusted, and the trusted source of secrets of the multitenant computational environment may use the indication to authenticate the service or device as a trusted service or trusted device. As an example, the resource or component may provide identification in data (e.g., metadata) of the request to the trusted source of secrets. The trusted source of secrets may use such data to determine whether to authorize the service or device for receipt of security context data.

If the trusted source of secrets determines that the service is not a trusted, flow will branch "No" and the trusted source of secrets will deny the request for the security context data (e.g., operation 308). If the request is denied at operation 308, flow proceeds to operation 310 where the shared application platform may log the unauthorized attempt to access the security context data. Counters may be employed by the multi-tenant computational environment to track intrusion attempts.

When the service or device is authenticated, the trusted source of secrets may transmit the security context data and a trusted service may be implemented to enforce the security context data. The trusted service may receive the security context data (operation 312). Flow proceeds to operation 314 where the trusted service may unseal the security context data. As an example, the trusted service may interface with a security component of a security framework for the shared application platform 108 such as a protocol for wrapping/unwrapping application security context data in order to unseal the security context data for evaluation. As an example of unsealing, the protocol may decrypt the encrypted security context data using a private key that is only provided by the security framework of the shared application platform 108 if the service (or device) is trusted. As discussed with respect to FIG. 2, tenants may encrypt data associated with a request that is to be transmitted through the multi-tenant computational environment using the protocol used for wrapping the application security context data. In one example, the protocol may allow tenants may use public keys for encryption but deny tenants the ability to decrypt sealed data. The ability to unseal data is restricted to only trusted components of the shared application platform 108.

Once the security context data is unsealed (operation 314), the trusted service may evaluate the security context data based on a processing associated with the application request (operation 316). As identified above, multiple pieces of security context data may be associated with a tenant. At operation 316, the trusted service evaluates whether a tenant that initiated the request has access rights to execute its application using the associated security context data. As an example, the trusted service may compare data of the tenant's identifier or (tenant registration ID) with the security context data received from the trusted source of secrets. That is, operation 316 may evaluate the request and the security context data. A tenant is authorized if the security context data validation passes. At decision operation 318, the trusted service determines if the tenant is authorized to execute the application of the request based on evaluation (operation 316) of the request and the security context data.

If the tenant is not authorized to execute an application in the context as requested, flow branches to operation 320 where the request is denied. When the request is denied due to the tenant not having access rights, the denial is logged as an intrusion attempt (operation 322). Counters may be employed by the shared application platform's security framework to track intrusion attempts. As an example, counters may be used to track data specific to components that request access to security context data and data specific to authorization of a tenant to execute a process based on a piece or portion of security context data used for authentication and authorization of the tenant to execute the process.

If a tenant is authorized to execute an application of the request, flow proceeds to operation 324 where the trusted service processes or runs the application under a service account of the tenant. Running a processing under a tenants' own service account may help ensure that multiple tenants can safely have their processes running on a same component of a shared application platform. Tenant service accounts may have restricted privileges compared with trusted machine accounts of the shared data platform hosted on the multitenant computational environment. That is, a new process may be created to execute processing associated with a tenant request, and that new processing is run on a tenant service account that is only privileged to execute that processing. This may minimize the risk of unauthorized access by a tenant in the multi-tenant computational environment.

Flow may then proceed to operation 326 where request processing may be reported back to the tenant that initiated the request.

In an exemplary shared application platform implementing a security framework, the following is a table describing the integrated security provided by the security framework:

| Task | Approach |
|---|---|
| Execute tenant job under lower privileges than trusted accounts | Impersonation of tenant jobs under service accounts, while trusted resources are executed under machine account |
| Secure communication channel between Internal Resource and tenant job | Named secure communication channel based on a tenant job execution context |
| Protect credentials for running tenant jobs | Provide a common format for tenants to provide sealed security context data (e.g. service account credentials), and configure their jobs to run in this context |
| Add intrusion detection capability based on tenant job behavior | Bundle tenants' secrets to their execution contexts, to enable detection of intrusion attempts |

Figure 4:
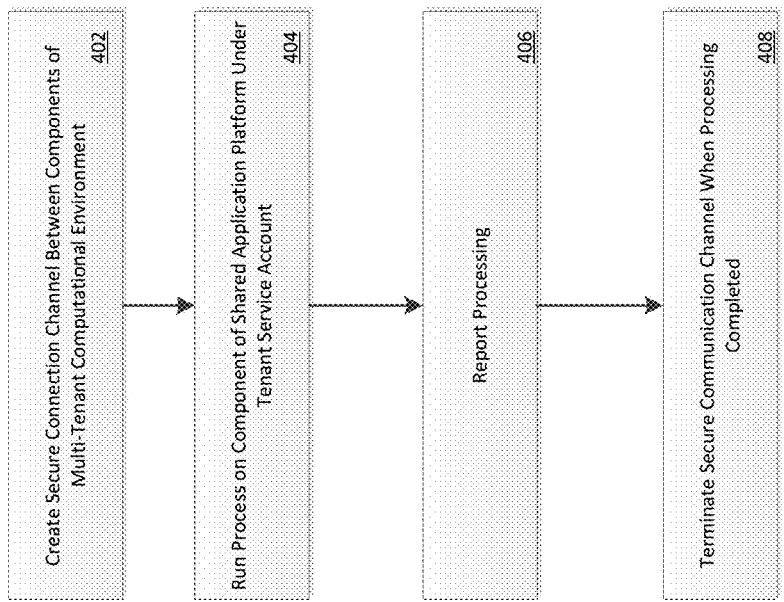
FIG. 4 is a method demonstrating processing of a request over a multi-tenant computational environment.

FIG. 4 is a method 400 demonstrating processing of a request over a multi-tenant computational environment. Method 400 is initiated at a point where a tenant is authorized to execute an application on a shared application platform such as the shared application platform 108 of FIG. 1. Method 400 begins at operation 402 where a secure connection channel (e.g., secure communication pipeline) is created between two components of the multi-tenant computational environment. A secure connection channel is a communication pathway created between a component of the shared application platform and a tenant application. A component may be any trusted hardware or software resource applicable to the multi-tenant computational environment.

Once the secure connection channel is created (operation 402), flow proceeds to operation 404 where a process is run on a component of the shared application platform under a service account of a tenant that initiated a processing request. Running the process using a tenant service account and interacting with it through a secure connection for provisioning pieces of security context data at run time provides that a tenant can safely have its application running on a shared application platform that may also be running other tenant applications. This may minimize the risk that tenant's data would be exposed to unauthorized access by other tenants. In one example, the trusted service for enforcement and provisioning of execution context of a shared application platform may impersonate tenant jobs under tenant service accounts, while the trusted service for enforcement and provisioning of execution context executes under a machine account. In one example, a machine account of a trusted component may be a high-privileged account. That is, the tenant service account has a lowest possible privilege and is authorized to perform only processing that is allowed under the enforced security context. Whether or not the processing completes, flow proceeds to operation 406 where a reporting of processing is generated. In one example, a reporting may be provided to an administrator or monitor of the trusted service. In another example, reporting may be provided to a tenant that initiated the application request.

Once the request for processing has completed, the flow concludes and the secure connection is terminated (operation 410). In an exemplary shared application platform, if a tenant wishes to execute another application, a new secure communication channel would need to be established once the tenant is authorized by the shared application platform to execute another application. It is initiated by the trusted service to prevent security breaches or abuse of the tenant service account.

Figure 5:
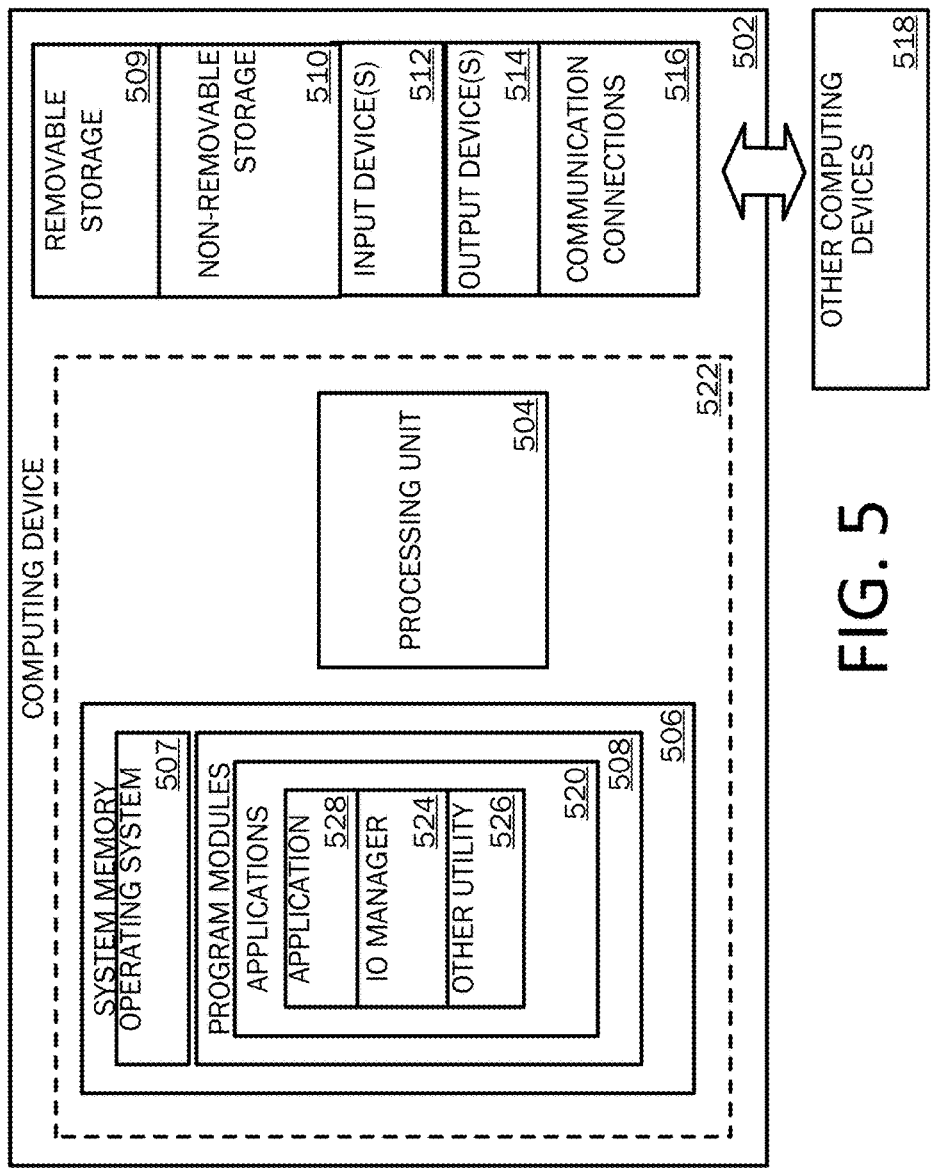
FIG. 5 is a block diagram illustrating an example of a computing device with which aspects of the present disclosure may be practiced.
Figure 6A:
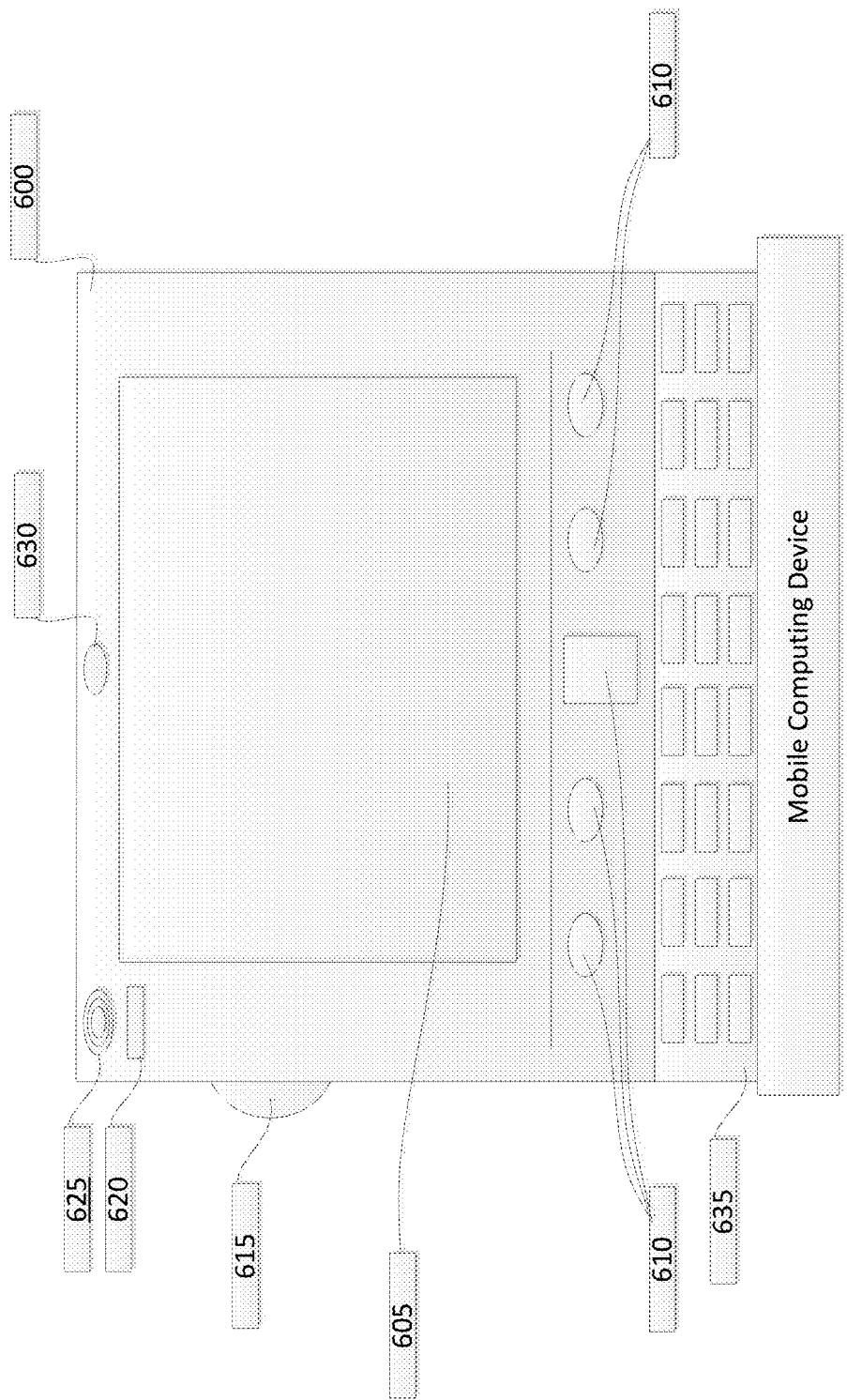
FIGS. 6A and 6B are simplified block diagrams of a mobile computing device with which aspects of the present disclosure may be practiced.
Figure 6B:
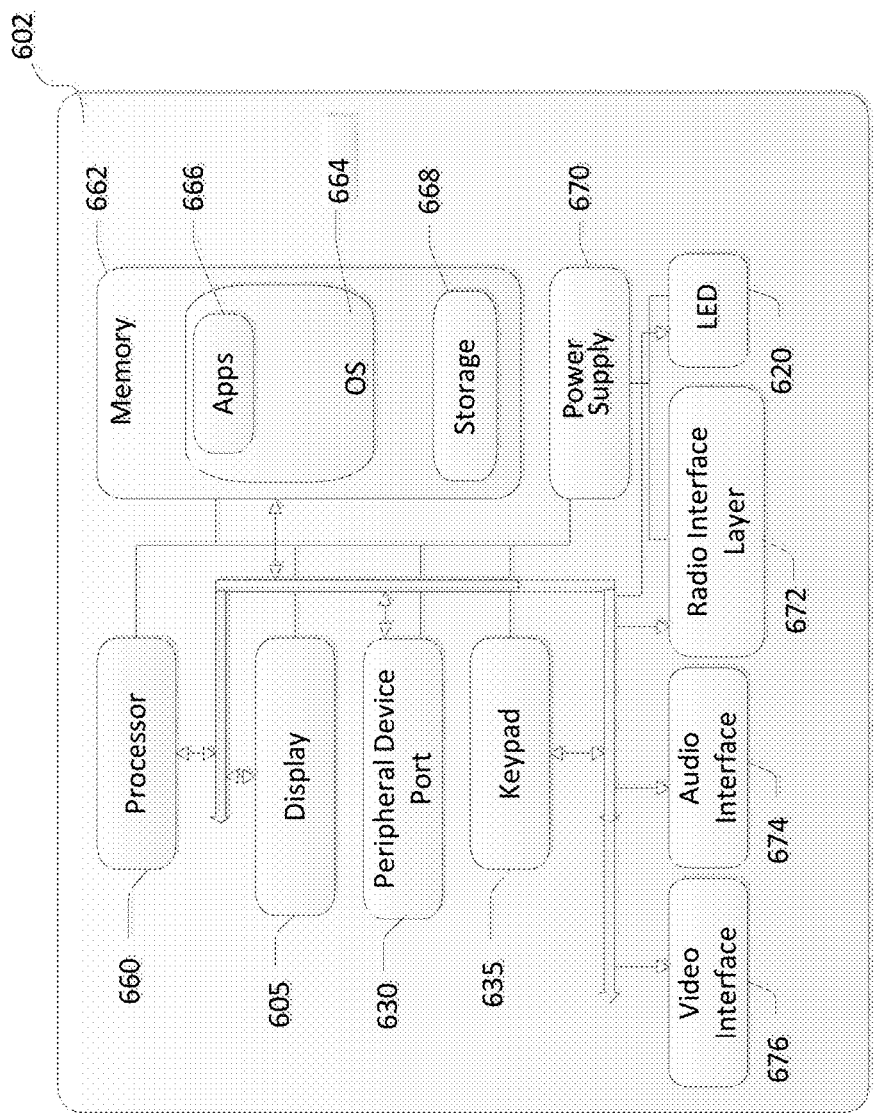
Figure 7:
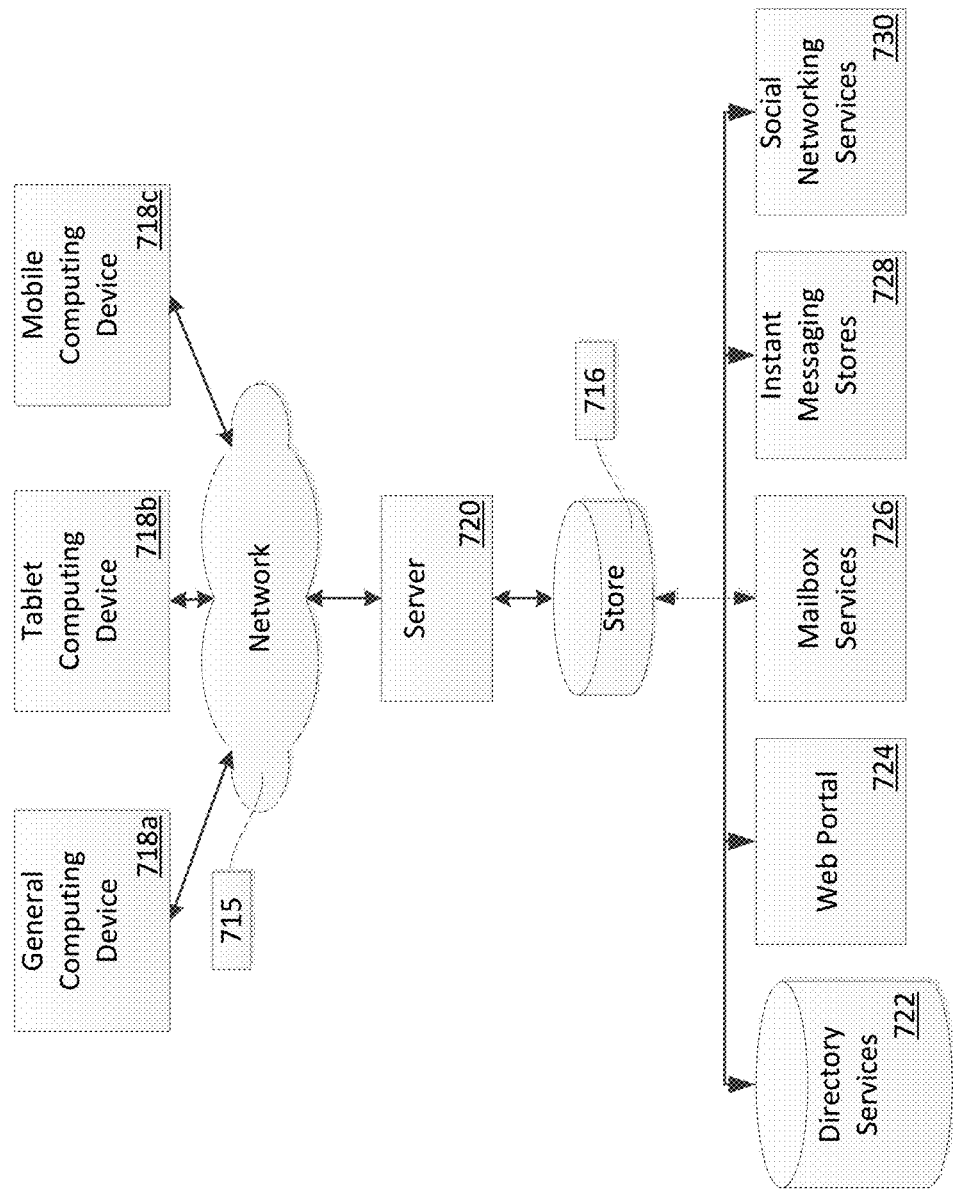
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, a component of a tenant, the shared application platform 108 or a data resource such as data resource 120 and 122 as described herein, with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application for data replication 528, IO manager 524, and other utility 526. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., application 528, Input/Output (I/O) manager 524, and other utility 526) may perform processes including, but not limited to, one or more of the stages of the operational flows 200-400 illustrated in FIGS. 2-4, for example. Other program modules that may be used in accordance with examples of the present invention may include electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which examples of the invention may be practiced. For example, mobile computing device 600 may be used to implement a tenant, component of a shared application platform 108 or a data resource. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application for data replication 528, IO manager 524, and other utility 526 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 528, IO manager 524, other utility 526, and storage (e.g., storage 104 and storage 110) may be stored in different communication channels or other storage types. For example, various documents may be stored using a directory service 722, a web portal 724, a mailbox service 726, an instant messaging store 728, or a social networking site 730. Application 528, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

According to one exemplary computer-implemented process, a security context is generated based on security context data provided by a tenant, to be transmitted through a multi-tenant computational environment. In one example, the security context data may be used to specify rights for access to data associated with the security context data. The security context data sent includes at least one of a token, a certificate, a database connection string, or tenant service account credentials. The security context data is wrapped with a protection layer that restricts an ability to access the security context data by untrusted devices and services of the multi-tenant computational environment. Furthermore, the security context data is wrapped with a protection layer that prevents un-authorized tenants from using the security context. The security context data is then transmitted for processing to a shared application platform of the multi-tenant multitenant computational environment. In one example, the security context data is sent to a trusted resource of secrets of the multitenant computational environment.

In an example computer-implemented method, data is received at a component of a multi-tenant computational environment. Security context data associated with a tenant application may be stored to a trusted source of secrets of the multi-tenant computational environment. As an example, the trusted source of secrets may be a trusted platform module. The component may receive security context data associated with a tenant application if the component is authorized to receive the security context data. The component may provide indication to the trusted source of secrets that the component of the multi-tenant computational environment is a trusted component authorized to receive the security context data. Security context data is at least one of a token, a certificate, and credentials. The component evaluates the security context data to authorize use of the security context data by the tenant application for execution. The component may implement a trusted service to evaluate the security context data of the tenant. In the evaluating, a registration identification of the tenant provided may be compared with a stored registration id of the tenant to determine whether the tenant is authorized to use the security context for running the tenant application. The component may unseal security context data using a private key present on the trusted component. The component being a trusted component may run the tenant application in a context associated with the security context data if the tenant application is authorized based on evaluation of the security context data. As an example, the running may further comprise initiating the trusted component to run the tenant application under a provisioned service account for the tenant having only privileges to run the application in the context associated with the security context data. To run the tenant application, a secure communication channel may be created between a trusted component and the tenant application. Intrusion attempts may be monitored to detect unauthorized access to the security context data.

In an exemplary system, a device operating in a multi-tenant computational environment may include a memory and at least one processor. The processor of the device may be configured perform a process. The process may include receiving security context data at a trusted component of the multi-tenant computational environment. As an example, the multi-tenant computational environment may be a cloud-computing environment. The device may access a trusted platform module to receive the security context data, and the trusted platform module may provide the security context data to the device only if the device is the trusted component. The device determines whether a tenant is authorized to execute an application under a security context based on evaluation of the security context data. Evaluation of the security context data may comprise implementing a trusted service to evaluate the security context data of the tenant. As an example, the trusted service compares a registration identification of the tenant provided with security context data and a registration id of the tenant stored by the trusted service to determine whether the tenant is authorized to use the security context for running the application of the tenant. The trusted component runs the application using a service account of the tenant to access a data resource of the multi-tenant computational environment if the tenant is authorized. As an example, the service account of the tenant is restricted to execute only a process associated with the security context data.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
receiving, by a tenant component of a multi-tenant computational environment, a request to access security context data by a tenant application of a tenant in the multi-tenant computational environment;
unsealing a first protection layer of the security context data based on a determination that the tenant component is part of a trusted service of the multi-tenant computational environment;
unsealing a second protection layer of the security context data based on a determination that the tenant application is authorized to access the security context data; and
executing the tenant application in a context defined by the security context data based on the determination that the tenant application is authorized to access the security context data, wherein the executing of the tenant application further comprises launching a provisioned service account for the tenant application to execute operations associated with the security context data, and wherein the provisioned service account has restricted privilege as compared to an account of a tenant.

2. The method according to claim 1, further comprising implementing the trusted service to evaluate the security context data of the tenant application, and restricting the provisioned service account to have only privileges consistent with the context defined in the security context data.

3. The method according to claim 1, further comprising storing the security context data to a trusted source of secrets of the trusted service, wherein the trusted source of secrets is un-accessible by the tenant application.

4. The method according to claim 3, wherein the trusted source of secrets is a trusted platform module.

5. The method according to claim 3, wherein the tenant component provides an indication to the trusted source of secrets that the tenant component is a trusted component of the trusted service.

6. The method according to claim 1, further comprising:
creating a secure communication channel between the trusted service and the tenant application, wherein the secure communication channel is launched using a service account of the tenant of the multi-tenant computation environment to enable the trusted component to pass the security context data to the tenant application at run time.

7. The method according to claim 1, further comprising: monitoring intrusion attempts to detect unauthorized access to the security context data.

8. The method according to claim 1, wherein the unsealing of the second protection layer further comprises comparing a registration identification of the tenant application and a stored registration identification of the tenant application to determine whether the tenant application is authorized to-access the security context data.

9. The method according to claim 1, wherein the unsealing of the second layer further comprises unsealing the security context data using a private key.

10. The method according to claim 1, wherein the security context data is at least one of a token, a certificate, and credentials.

11. A system, comprising:
at least one processor; and
a memory operatively connected with the at least one processor, wherein the memory stores thereon computer-executable instructions, that when executed on the at least one processor, cause the at least one processor to:
receive security context data at a trusted component of a multi-tenant computational environment;
determine whether to unseal a first protection layer of the security context data for a tenant component of the multi-tenant computational environment to access the security context data, wherein the first protection layer prevents an ability to access the security context data by devices and services external to a trusted service of the multi-tenant computational environment;
in response to determining to unseal the first protection layer, determine whether to unseal a second protection layer of the security context data to enable the tenant component to execute an application in a context associated with the security context data, wherein the second protection layer prevents unauthorized tenant components of the trusted service from executing the application in the context of the security context data; and
in response to determining to unseal the second protection layer, launching a restricted service account for the tenant component to execute the application in the context of the security context data, wherein the restricted service account has restricted privilege as compared to an account of a tenant.

12. The system according to claim 11, wherein the multi-tenant computational environment is a cloud-computing environment.

13. The system according to claim 11, wherein the system accesses a trusted platform module to receive the security context data, and wherein the trusted platform module provides the security context data to the system through a secure communication channel launched after unsealing the first protection layer and the second protection layer.

14. The system according to claim 11, wherein a determination as to whether to unseal the second protection layer further comprises implementing the trusted service to evaluate the security context data of the tenant component.

15. The system according to claim 14, wherein the trusted service compares a registration identification of the tenant component that is provided with security context data and a registration identification of the tenant component that is stored by the trusted service in order to determine whether the tenant component is authorized to access the security context data.

16. A computer-readable storage medium having computer-executable instructions thereupon that, when executed by a computer, cause the computer to perform a set of operations comprising:
  receiving, by a tenant component of a multi-tenant computational environment, a request to access security context data by a tenant application of a tenant in the multi-tenant computational environment;
  unsealing a first protection layer of the security context data based on a determination that the tenant component is part of a trusted service of the multi-tenant computational environment;
  unsealing a second protection layer of the security context data based on a determination that the tenant application is authorized to access the security context data; and
  executing the tenant application in a context defined by the security context data based on the determination that the tenant application is authorized to access the security context data, wherein the executing of the tenant application further comprises launching a provisioned service account for the tenant application to execute operations associated with the security context data, and wherein the provisioned service account has restricted privilege as compared to an account of a tenant.

17. The computer-readable storage media of claim 16, wherein the set of operations further comprises:
  implementing the trusted service to evaluate the security context data of the tenant application, and restricting the provisioned service account to have only privileges consistent with the context defined in the security context data.

18. The computer-readable storage media of claim 16, wherein the set of operations further comprises:
  creating a secure communication channel between the trusted service and the tenant application, wherein the secure communication channel is launched using a service account of the tenant of the multi-tenant computation environment to enable the trusted component to pass the security context data to the tenant application at run time.

19. The computer-readable storage media of claim 16, wherein the unsealing of the second layer further comprises unsealing the security context data using a private key.

* * * * *